United States Patent Office 2,898,366
Patented Aug. 4, 1959

2,898,366

SYNTHESIS OF ESTERS OF LOWER ALIPHATIC ALCOHOLS

Lawrence G. Hess and Helmut W. Schulz, Charleston, W. Va., assignors to Union Carbide Corporation, a corporation of New York No Drawing. Application August 5, 1957
Serial No. 676,443

9 Claims. (Cl. 260—488)

This invention relates to the synthesis of organic oxygen-containing compounds, and, more particularly to the synthesis of oxygen-containing compounds by the reaction of alcohols and carbon monoxide in the presence of suitable catalysts. More specifically, this invention is directed to a vapor phase process for the preparation of esters of lower aliphatic alcohols by the reaction of a lower aliphatic alcohol and carbon monoxide. The reaction whereby the esters of lower aliphatic alcohols are obtained in accordance with this invention may be written as follows:

$$2ROH + CO \rightarrow RCOOR + H_2O$$

wherein R represents a lower aliphatic hydrocarbon radical composed of carbon, hydrogen and oxygen.

As is well known when carbon monoxide is reacted with an alcohol a variety of carbonylated products are produced including esters, acids, ethers and the like. It has been discovered that when carbon monoxide and an alcohol are reacted at elevated temperatures and pressures in the presence of a nickel or nickel carbonyl catalyst promoted with a minor amount of hydrogen iodide there is produced a reaction mixture wherein the carbonylated product is predominately the ester of a lower aliphatic monohydric alcohol.

Considerable work has been done in the field to which this invention relates, and, as a consequence, there are a number of patents and literature publications outstanding which describe the reaction of methanol and carbon monoxide in the presence of various catalysts. The reactions described in the prior art were principally liquid phase processes and produced various products including, for example, acetic acid, methyl acetate and other oxygen containing products, all in low productivity. We have found that by employing our particular catalysts in an essentially vapor phase process we have been able to obtain high productivity of the esters of lower aliphatic alcohols when carbon monoxide and a monohydric lower aliphatic alcohol are reacted in the presence of these catalysts under the reaction conditions provided by this invention.

Heretofore, it has been known that methyl acetate, as well as other simple esters in the case of the appropriate alcohol, can be prepared by the reaction of carbon monoxide and methanol in the presence of certain catalysts, such as, for example, the ferrites, ferrates, cobaltites and cobaltates of the alkali and alkaline earth metals, including sodium, potassium, barium, calcium, magnesium and aluminum. It has also been known that the lower aliphatic alcohols may react with carbon monoxide to form either the carboxylic acid or the esters in the presence of catalysts, such as the oxides, acetates and methylates of the heavy metals, such as, for example, copper, tin, lead, zinc and aluminum, or mixtures thereof. Furthermore, it has been known heretofore that methyl acetate can be prepared by the reaction of methanol and carbon monoxide in the presence of a volatile halide of boron, such as boron trifluoride and the like. Also, various silicotungstates, borates and phosphates have been used as catalysts for the reaction. Nickel and cobalt halides have been mentioned as substances which may be employed in combination with boron trifluoride, or activated carbon as catalysts for the reaction, according to the prior art.

In general, the aforementioned processes for the reaction of methanol and carbon monoxide were liquid phase processes and either involved the use of highly corrosive catalysts, or gave rise to comparatively low yields of the desired end products, such as, acetic acid, or methyl acetate.

Therefore, it is an object of this invention to provide an improved process for reacting alcohols with carbon monoxide to produce esters of high molecular weight. Another object of this invention is to produce esters from an alcohol and carbon monoxide in high yield by the utilization of a catalyst which is soluble in the alcohol thereby providing an improvement in adapting the process to continuous operation.

It is a further object of this invention to provide a novel process for the production of esters of lower aliphatic alcohols to the substantial exclusion of other oxygenated products formed during the reaction. A still further object of this invention is to provide a novel process for reacting carbon monoxide and a lower aliphatic monohydric alcohol to produce a reaction mixture comprising essentially the carbonylated product in the form of an ester of the particular lower aliphatic monohydric alcohol.

It has been discovered that when a lower aliphatic monohydric alcohol, such as, methanol, and carbon monoxide are reacted together in the presence of a catalyst comprising a nickel salt of an aliphatic monocarboxylic acid promoted with a minor amount of iodine or hydrogen iodide, we obtain an ester of the lower aliphatic acid containing one more carbon atom than the monohydric alcohol in very high yields. Additionally, when the catalysts of this invention are used, for example, in conjunction with carbon monoxide and methanol the reaction is directed preferentially to the formation of methyl acetate rather than acetic acid.

The nickel salts of aliphatic monocarboxylic acids suitable for use in the process of this invention are nickel formate, nickel acetate and nickel propionate. The preferred salt is nickel acetate.

The process of this invention is usually carried out at a temperature not substantially lower than 325° C. Essentially the reaction is a vapor phase reaction, since the preferred operating temperature range (325° C. to 400° C.) is above the critical temperatures of methanol, methyl acetate and acetic acid. Superatmospheric pressures are generally employed while pressures ranging upwards of 3000 p.s.i. are preferable. Most advantageous results are obtained when operating in a pressure range of from about 4000 p.s.i. to about 6000 p.s.i.

One of the advantages derived from using the catalyst and promoter combinations is that the catalyst and promoter are soluble in the reactant methanol.

Catalyst concentrations are important in the practice of this invention only to the extent that enough catalyst should be present to promote the carbonylation of the alcohol. Catalyst concentrations in the range of about 0.5% to about 2%, by weight, of the nickel salt of the monocarboxylic acid, based on the quantity of alcohol charged to the reaction, are usually sufficient to promote the reaction.

The amount of promoter is not necessarily critical but should be present in an amount sufficient to activate the catalyst. A preferred range of promoter concentration is in the range of about 10% to about 50%, by weight, based on the weight of catalyst charged to the reaction vessel.

In the practice of the invention the mol ratio of carbon monoxide to lower aliphatic monohydric alcohol is not necessarily critical and can be varied over a wide range. It has been found that suitable conversions of alcohol to esters can be obtained when the mol ratio of carbon monoxide to alcohol is varied from as low as 0.63:1 to as high as 2.07:1. It is preferred however to operate the process of this invention wherein the mol ratio of carbon monoxide to alcohol is maintained in the range of from 1:1 to about 1.5:1.

Broadly stated, this invention is directed to a process for the production of organic oxygen-containing compounds, which comprises reacting a saturated aliphatic monohydric alcohol with carbon monoxide in the presence of a catalytic quantity of a nickel salt of an aliphatic monocarboxylic acid promoted with a minor amount of a compound selected from the group consisting of iodine and hydrogen iodide and separating, from the resulting reaction product, the organic oxygen-containing compounds produced by the reaction. More specifically, our invention is directed to a process for the production of methyl acetate, which comprises reacting methanol and carbon monoxide at an elevated temperature in the range of 325° C. to 400° C. and at an elevated pressure in the range of from about 4000 p.s.i. to about 6000 p.s.i. in the presence of a catalytic quantity of nickel acetate promoted with a minor amount of a compound selected from the group consisting of iodine and hydrogen iodide.

The carbonylation reaction may be carried out, either continuously or by batch process, as desired.

The following Table I illustrates a series of batch experiments defining the minimum reaction conditions which would afford acceptable conversions and productivities for the reaction of methanol and carbon monoxide to form methyl acetate or acetic acid.

Thus, the standard conditions for the experiments illustrated in Table I were set at a temperature of 350° C., a system pressure of 4000 p.s.i. to 5500 p.s.i., an effective reaction time of 15 to 30 minutes, and a carbon monoxide to methanol molar ratio of 1.5:1 except as indicated.

The carbonylation of methanol was carried out in a rocker-type reaction vessel similar to those used in established techniques for laboratory hydrogenations. In some experiments, removable glass liners were employed.

After the reaction vessel had been charged with liquid and solid components, it was closed and placed in the heating and rocking mechanism, which was suitably fitted with the necessary auxiliary equipment. Carbon monoxide was introduced into the reaction vessel at approximately 500 p.s.i. and expelled from the vessel three times to insure a complete purging of the system. Reaction gas was then added up to the pressures calculated from the gas law relationships to give the desired total pressure at the approximate expected temperature of reaction. The calculations were modified as suggested by the data obtained in the course of the experiments.

Next, rocking and heating were initiated in a manner which would result in minimum exposure to warm-up period and yet would not result in temperatures excessively above the desired operating temperature. When the reaction conditions had been maintained for the required period of time, heating was discontinued and a stream of air was passed around the reaction vessel (inside the heater) to facilitate rapid cooling of the reaction vessel and its contents to approximately 50° C. This cooling air was also used to help control the exothermic reactions.

When low boiling components were expected in the reaction product a blowdown procedure was used which involved chilling the reaction vessel in acetone-solid carbon dioxide slurry prior to bleeding the gas. The gas was discharged through a fifty-foot copper coil and cold traps cooled with acetone-solid carbon dioxide slurry, then passed through a gas sample tube and measured finally with a wet-test gas meter. If a glass liner was used, separate weights were obtained on the material recovered inside the liner and the material removed from the bomb outside the liner, both portions being combined for distillation and analysis. A complete analysis was obtained by fractional distillation, followed by a chemical analysis of the fractions, which permitted calculation of the data presented in Table I.

*Table I*

| Run | Catalyst and Promoter | Weight, percent [b] | Temperature, °C. | | Pressure, p.s.i. Maximum | Reaction Time (Min.) | Methanol Conversion, percent | Efficiencies (Percent) | | | |
|---|---|---|---|---|---|---|---|---|---|---|---|
| | | | Initial [a] | Maximum | | | | Total | Methyl Acetate | Acetic Acid | Dimethyl Ether |
| 1 | Nickel Acetate / Hydrogen Iodide | 1.4 / 0.7 | 347 | 396 | 5,000 | 15 | 67.7 | 83.7 | 67.1 | 12.5 | 4.1 |
| 2 | Nickel Acetate / Iodine | 1.4 / 0.4 | 334 | 345 | 4,300 | 30 | 74.0 | 89.1 | 76.0 | 8.9 | 4.2 |
| 3 | Nickel Acetate / Hydrogen Iodide | 1.4 / 2.0 | 323 | 346 | 4,100 | 15 | 79.4 | 86.7 | 58.9 | 9.6 | 18.2 |
| 4 | Nickel Acetate / Hydrogen Iodide | 1.4 / 0.2 | 352 | 359 | 4,500 | 15 | 78.9 | 71.7 | 59.0 | 12.7 | |
| 5 | Nickel Acetate / Hydrogen Iodide | 1.4 / 0.1 | 350 | 362 | 4,700 | 30 | 61.6 | 83.8 | 77.1 | 4.7 | 2.0 |
| 6 | Nickel Acetate (No Promoter) | 1.4 | 350 | 350 | 5,400 | 15 | 10.0 | | | | |
| 7 [c] | Nickel Acetate / Hydrogen Iodide | 2.15 / 0.92 | 320 | 358 | 6,000 | 15 | 88.7 | | 82.5 | 9.8 | |
| 8 [d] | Nickel Acetate / Hydrogen Iodide | 2.0 / 1.8 | 342 | 346 | 5,000 | 50 | 61.2 | | 68.8 | 4.5 | |

[a] Temperature at which the reaction was initiated.
[b] Catalyst and promoter concentrations based on alcohol charged.
[c] Molar ratio of carbon monoxide to methanol was 0.63:1.
[d] Molar ratio of carbon monoxide to methanol was 2.07:1.

From an examination of the data presented in Table I it is interesting to note that when nickel acetate is used without a promoter (run 6), the conversion of methanol is low. Additionally, methyl acetate was produced as the predominant product even though the ratio of carbon monoxide to methanol was varied over a wide range as illustrated by runs 7 and 8.

Similarly, ethyl propionate was produced when a mixture of 318 grams of ethanol, 4.0 grams of nickel acetate, and 2.1 grams of hydrogen iodide was reacted with carbon monoxide in the same type of equipment described above for batchwise reactions of methanol and carbon monoxide. The reaction vessel and contents were heated under an initial carbon monoxide pressure of 1200 pounds per square inch to a temperature of 350° C. and maintained at 350 to 360° C. and a pressure of 4200 pounds per square inch for a period of ten minutes. Distillation of the crude reaction product discharged from the cooled reaction vessel gave fractions which through chemical and mass spectrometric analyses demonstrated yields of ethyl propionate and propionic acid of 43.3 and 6.9 percent, respectively, based on the ethanol charged to the reaction vessel.

Table II is presented below to illustrate the marked differences in conversions, yields, catalytic materials and operating conditions between this invention and previous processes for the production of methyl acetate by the reaction of methanol and carbon monoxide.

Table II

| Reference | Methanol, Grams | Water, Grams | Catalyst and Promoter | Grams | Temperature, °C. | | Pressure, p.s.i., Maximum | Reaction Time, Minutes | Methanol Conversion, Percent | Methyl Acetate Yield, Percent[a] |
|---|---|---|---|---|---|---|---|---|---|---|
| | | | | | Initial | Maximum | | | | |
| Example 1, Prior Art | 128 | 36 | Cobalt Acetate / None | 12 | 220 | 225 | 11,600 | 35 | 26.5 | 15.6 |
| Example 2, Prior Art | 64 | 72 | Cobalt Acetate / None | 5 | 220 | 220 | 10,250 | 30 | 7.0 | |
| Example 3, Prior Art | 64 | 72 | Cobalt Acetate / None | 5 | 220 | 220 | [b]10,250 | 30 | 25.0 | |
| Run 1, Table I | 246 | | Nickel Acetate / Hydrogen Iodide | 3.5 / 1.8 | [c]347 | 396 | 5,000 | 15 | 67.7 | 45.3 |
| Run 4, Table I | 237 | | Nickel Acetate / Hydrogen Iodide | 3.3 / 0.5 | [c]352 | 359 | 4,500 | 15 | 78.9 | 46.5 |

[a] Yield based on methanol charged.
[b] 1:3 ratio of $H_2$ to CO in process gas.
[c] Temperature is above critical temperature of reactants and products.

Table III, set forth below, reflects the high productivity of the process of our invention in terms of grams of product per hour per liter of methanol charged to the reaction which is in sharp contrast to the known process as illustrated in Table II, which utilizes from 6 to 8.5 percent, by weight of a cobalt acetate catalyst and discloses, at best, an hourly conversion rate of methanol to methyl acetate of from 15 to 50 percent.

Table III

| Run[a] | Production Ratio[b] | |
|---|---|---|
| | Methyl Acetate | Acetic Acid |
| 1 | 1,845 | 558 |
| 2 | 1,016 | 194 |
| 3 | 1,780 | 473 |
| 4 | 1,700 | 433 |
| 5 | 876 | 85 |
| 6 | | |
| 7 | 508 | 154 |
| 8 | 1,543 | 163 |

[a] Corresponding to the runs of Table I.
[b] Grams of product per hour per liter of methanol charged.

The procedure given below illustrates a suitable method of carrying out this invention by a continuous process. The converter is a high-pressure reactor equipped with a Dowtherm jacket, the reactor being filled with a catalyst support similar to Alfrax or Aloxite. Methanol containing the nickel acetate catalyst and the promoter, hydrogen iodide, is fed to the converter by means of a high-pressure liquid pump. Carbon monoxide under 4500 pounds per square inch pressure is mixed with the methanol feed at the entry to the reactor. The carbon monoxide and methanol pass through the reactor at 350° C. to 370° C. The reaction products pass out of the reactor through an expansion valve (pressure controller), where the pressure is reduced from 4500 pounds per square inch to 20 to 25 pounds per square inch, through a condenser, and into a liquid separator vessel, where the liquid products are collected, measured, and processed periodically. The slight back pressure of 20 to 25 pounds per square inch is beneficial in the condensation of the low boiling products. The off-gas from the liquid separator may be re-compressed and recycled to the reactor.

This application is a continuation-in-part of application Serial No. 384,774, filed October 7, 1953, now abandoned.

What is claimed is:

1. In a process for the production of esters of lower alkanols wherein the ester formed contains one more carbon atom than the sum of the carbon atoms of two alkanol molecules in which a lower alkanol is reacted with carbon monoxide, the improvement which comprises carrying out the reaction in the presence of a catalytic amount of a nickel salt of a lower alkanoic acid promoted with a minor amount of a compound selected from the group consisting of iodine and hydrogen iodide at a temperature in the range of from 325° C. to 400° C. under superatmospheric pressures in the range of from 3000 to 6000 pounds per square inch absolute.

2. In a process for the production of esters of lower alkanols wherein the ester formed contains one more carbon atom than the sum of the carbon atoms of two alkanol molecules in which a lower alkanol is reacted with carbon monoxide, the improvement which comprises carrying out the reaction in the presence of nickel acetate promoted with a minor amount of hydrogen iodide at a temperature in the range of from 325° C. to 400° C. under superatmospheric pressures in the range of from 3000 to 6000 pounds per square inch absolute.

3. In a process for the production of esters of lower alkanols wherein the ester formed contains one more carbon atom that the sum of the carbon atoms of two alkanol molecules wherein a lower alkanol is reacted with carbon monoxide, the improvement which comprises carrying out the reaction in the presence of nickel acetate promoted with a minor amount of iodine at a temperature in the range of from 325° C. to 400° C. under superatmospheric pressures in the range of from 3000 to 6000 pounds per square inch absolute.

4. A process for the production of esters of lower alkanols wherein the ester formed contains one more carbon atom than the sum of the carbon atoms of two alkanol molecules which comprises reacting a lower alkanol with carbon monoxide in the presence of a catalyst comprising a nickel salt of a lower alkanoic acid promoted with a minor amount of a compound selected from the group consisting of iodine and hydrogen iodide at a temperature in the range of from 325° C. to 400° C. under superatmospheric pressures in the range of from 3000 to 6000 pounds per square inch absolute, and recovering the esters of said lower alkanols.

5. A process for the production of methyl acetate which comprises reacting methanol and carbon monoxide under superatmospheric pressures in the range of from 3000 to 6000 pounds per square inch absolute and at a temperature in the range of from 325° C. to 400° C. in the presence of nickel acetate promoted with a minor amount of a compound selected from the group consisting of iodine and hydrogen iodide.

6. A process for the production of methyl acetate which comprises reacting methanol and carbon monoxide under superatmospheric pressures in the range of from 3000 to 6000 pounds per square inch absolute and at a temperature in the range of from 325° C. to 400° C. in the presence of nickel acetate promoted with a minor amount of hydrogen iodide.

7. A process for the production of methyl acetate which comprises reacting methanol and carbon monoxide under superatmospheric pressures in the range of from 3000 to 6000 pounds per square inch absolute and at a temperature in the range of from 325° C. to 400° C. in the presence of nickel acetate promoted with a minor amount of iodine.

8. A process for the production of esters of lower alkanols wherein the ester formed contains one more carbon atom than the sum of the carbon atoms of two alkanol molecules which comprises reacting lower alkanols having dissolved therein a nickel salt of a lower alkanoic acid and a compound selected from the group consisting of iodine and hydrogen iodide with carbon monoxide at a temperature in the range of from 325° C. to 400° C. under superatmospheric pressures in the range of from 3000 to 6000 pounds per square inch absolute and recovering the esters of said lower alkanols.

9. A process for the production of esters of lower alkanols wherein the ester formed contains one more carbon atom than the sum of the carbon atoms of two alkanol molecules which comprises reacting lower alkanols having dissolved therein a nickel salt of a lower alkanoic acid and a compound selected from the group consisting of iodine and hydrogen iodide with carbon monoxide in the vapor phase under superatmospheric pressures in the range of from 3000 to 6000 pounds per square inch absolute and recovering the esters of said lower alkanols.

References Cited in the file of this patent

UNITED STATES PATENTS

| | | |
|---|---|---|
| 2,710,878 | Glasebrook | June 14, 1955 |
| 2,739,169 | Hagemeyer | Mar. 20, 1956 |